March 8, 1966     D. S. FOOTE ETAL     3,238,657
SPECIAL GUN CHAMBER TO PREVENT PLASTIC BODY MOUTH CUT OFF
Filed June 1, 1964
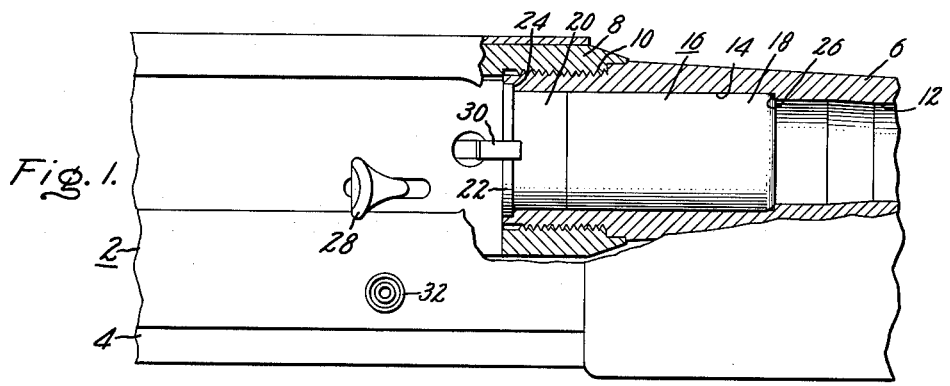
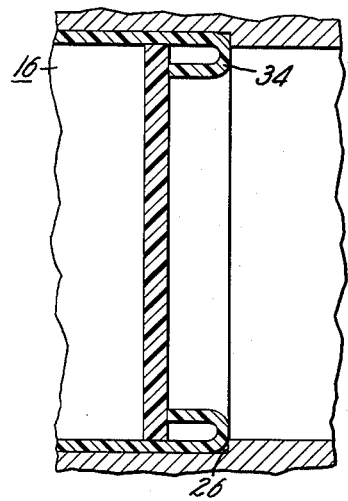
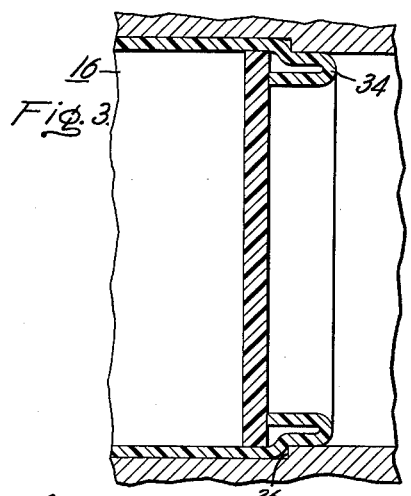
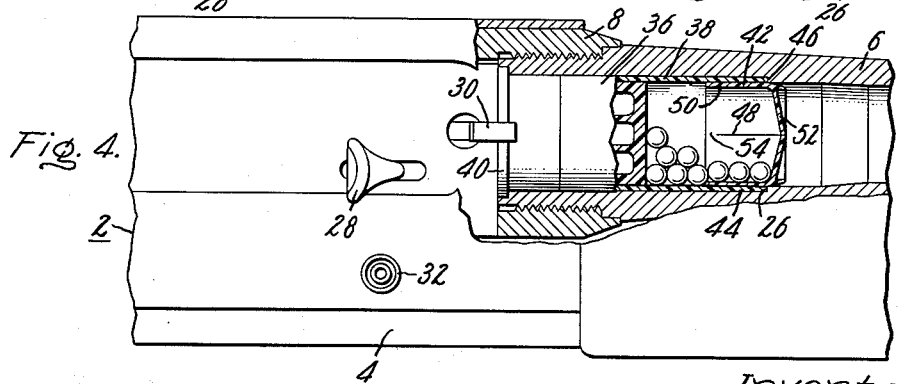
Inventors:
Donald S. Foote,
Justin H. Whipple,
by John H. Lewis Jr
John W. Phipps
Nicholas Skovran
Their Attorneys.

United States Patent Office 3,238,657
Patented Mar. 8, 1966

3,238,657
SPECIAL GUN CHAMBER TO PREVENT PLASTIC
BODY MOUTH CUT OFF
Donald S. Foote, Greens Farms, and Justin H. Whipple, Milford, Conn., assignors to Remington Arms Company, Inc., Bridgeport, Conn., a corporation of Delaware
Filed June 1, 1964, Ser. No. 371,305
1 Claim. (Cl. 42—76)

This application is a continuation-in-part of copending application, Serial Number 220,761, filed August 31, 1963, now abandoned.

This invention relates to an improvement in shotgun chamber design which permits the use of low cost molded polyethylene shotshell bodies without the objectionable tearing off of the body which occurs about one-third of the shell length below the mouth.

One of the major limitations in the use of plastic shotshell bodies has been the lack of sufficient longitudinal tensile strength in the body. At the time of firing, the shot column is compressed, resulting in a radial force component which causes the shot adjacent to the body to partially imbed in the plastic. This shot, moving forward, tends to pull the plastic body with it, causing body stretch and finally failure in tension. The means for eliminating these failures to date have been:

(1) Use of special processing techniques to develop plastic bodies of sufficient strength, (2) Use of a liner to act as a barrier between the shot and the plastic body.

This invention covers a third approach and consists of a gun chamber design in combination with a shotshell body made by simple molding or extrusion processes which would not have sufficient tensile strength to withstand firing in a conventional chamber.

The principal object of this invention is to provide an improved chamber design which will permit the use of low cost plastic shotshell bodies without the objectionable body cut-offs which usually accompany the use of plastic bodies made by simple molding or extrusion processes.

Another object of the present invention is to provide a mechanical stop which limits or prevents longitudinal stretching of the plastic shotshell and which, depending on the type of shotshell, can also be made to cut off the front crimped end portion of the shell.

Other objects will become apparent after reading the specification and claim and referring to the drawing, in which:

FIGURE 1 shows a side elevational view, with parts broken away and shown in section, of a shotgun chamber with a shotshell positioned therein wherein the front crimped end portion of the shell will be cut off by the mechanical abutment.

FIGURE 2 shows the relationship of the forward end of the shotgun chamber and the crimped end of the shotshell for the maximum length of chamber.

FIGURE 3 is similar to FIGURE 2 except that the relationship of the parts is shown for the minimum length of chamber.

FIGURE 4 shows a modified combination of a gun chamber and plastic shotshell with combination shot container-closure member positioned therein wherein there will be no cutting away of any portion of the shotshell by the mechanical abutment.

Referring to FIGURE 1, reference numeral 2 refers generally to a shotgun of the Remington Model 11–48 type in which a hollow receiver 4 is mounted. An elongated, cylindrical barrel 6, having a barrel extension 8 attached thereto by thread means 10, is positioned in the forward end of the receiver and held therein by locking means (not shown). The barrel 6 has a longitudinally-extending bore 12 which preferably is tapered slightly toward the outer end.

On the inner or breech end of the barrel is formed a chamber 14 in which a shotshell 16 is adapted to be positioned and supported while being fired. The shotshell body 18 of the present invention is made of low cost molded polyethylene which, as mentioned above, has limited longitudinal tensile strength and which almost always tears off at the mouth of the shell body upon firing. The head 20 of the shotshell can be made of any suitable material and has a rim 22 therein which seats in countersunk cavity 24 of barrel 6 to prevent further outward longitudinal movement of the shell in the barrel. The outer end of chamber 14 is defined by an inwardly projecting abutment 26 which is spaced a predetermined critical distance from the rear end of the chamber.

Located within the receiver 4 is a breech mechanism which functions to support the shotshell after firing. The function and details of the fire control mechanism are not part of the present invention and thus are omitted in order to focus attention on the invention itself. Only the operating handle 28, the extractor 30 and the carrier latch button 32 of the first control mechanism are shown in the drawing in order to show the chamber in proper perspective. The operating handle 28 is attached to the breech bolt and moves longitudinally to position the firing action in open or closed position. The carrier latch button 32 provides the control to release the breech bolt and move the shell into the chamber. The extractor 30 is attached to the breech bolt and moves therewith to engage the shell rim 22 and extract the shell from the chamber after firing.

It has been found that by utilizing the novel chamber design of the present invention, low cost molded polyethylene shotshell bodies can be used without the objectionable body cut-offs. The novel chamber design utilizes the idea of a stepped chamber where the shell chamber length relationship is carefully regulated so that upon firing the relatively weak polyethylene shotshell body will be supported by an abutment and prevented from being stretched longitudinally to the point of tensile failure.

After various tests, it was found that certain limits exist for shell-chamber length differences whereby body tears are effectively eliminated. The results of these tests show that a chamber length substantially equal to the length of a crimped shell to be the maximum length which will effectively eliminate body tears.

The minimum chamber length can be about 3/32″ less than the crimped shell length before chambering becomes noticeably difficult. This relationship would have the shell under some initial compression as shown in FIGURE 3. Since the uncrimped shell length is approximately 9/16″ longer than the crimped shell length, shell ejection difficulties would normally be expected. However, the excess body material is cut off at the chamber shoulder or abutment when the crimp opens up during firing, so that these ejection difficulties are not encountered.

FIGURES 1–3 show a combination of a special gun chamber and a molded plastic shotshell where the front end of the shotshell uses a conventional type closure, such as a top wad and roll crimp, as shown in FIGURES 2 and 3 or the more popular integral star crimp closure, as shown in the U.S. Patent 3,055,302. With each of this type of closure, the end of the plastic body casing is explosively forced against the mechanical abutment with the result that a portion of the shell is cut off.

This cutting off of the end of the shotshell is not in itself harmful or dangerous. However, an increasingly large number of shooters now reload their used shotshell cases so that the cutting off of any portion of the shotshell now becomes commercially undesirable.

The modification shown in FIGURE 4 shows a design whereby a low cost injection molded plastic shotshell casing can be used in a special gun chamber to prevent any cut-off of the shell. Moreover, the low cost plastic body casing can be reloaded merely by providing a new integral combination shot container-closure member, as explained below.

FIGURE 4 shows the same shotgun and chamber arrangement shown in FIGURES 1–3. A modified shotshell 36 is shown positioned within the chamber 14. Shotshell 36 includes a plastic tubular body casing 38 with a head section 40 closing off the rear end and an integral combination shot container-closure member 42 positioned in the mouth 44 of the casing.

The integral combination shot container-closure member 42 can be an injection molded plastic member and can enclose a portion or all of the shot pellets. FIGURE 4 shows one method of holding the container-closure 42 in the mouth end of the shotshell, i.e., by interference fit. Obviously, other methods are available including groove and detent means, etc. It can be seen that the end of the body casing 38 forms a definite straight edge 46 which is in substantial engagement with the mechanical abutment 26. Abutment 26 extends into the bore only enough to engage edge 46 but not enough to interfere with container-closure 42 when the shot pellets and container-closure 42 are explosively projected out of the shell and through the gun bore. The container-closure 42 has a plurality of longitudinally extending slits 48 in the tube side walls 50 of container-closure 42 and also transverse slits (not shown) in the closure portion 52. These slits permit the container-closure 42 to open up and pivot like a clam about unslit portion 54 upon being projected out of the gun barrel. Although FIGURE 4 shows container-closure 42 extending only part of the way into the cavity formed by the open-ended cartridge casing 38, it is obvious that the tubular walls of member 42 can extend inwardly to enclose all of the shot pellets.

Although the above discussion deals with a shotgun chamber and shotshell, it should be appreciated that the invention is also applicable to other types of guns where plastic shell body cut-off is a problem. For example, plastic shells are currently used in industrial cement kiln guns and the invention obviously is applicable to this use.

Although FIGURES 1 and 4 show a tapered forcing cone in the barrel bore slightly in front of the chamber abutment 26, it must be realized that either of the modified chamber designs, shown in FIGURES 1 or 4, eliminates the need for such a forcing cone. Thus, a secondary advantage of this invention is less cost since the elimination of the tapered forcing cone means less machining expense to manufacture the gun barrel.

What is claimed is:

In combination with a plastic shell having insufficient tensile strength to prevent body mouth cut-off when fired, said shell having a front end section including an open mouth end through which projectile means are explosively projected and a rear head section having a priming means mounted therein, a gun chamber comprising a bore which opens into a receiver means at one end and into an axially aligned barrel at the other end, said bore being adapted to slidably receive said plastic shell, means limiting the depth of insertion of said plastic shell head section into said bore, and means projecting inwardly from the inner periphery of said bore and positioned in substantial abutting relationship with said front end section of said plastic shell only to limit axial tensile movement of said plastic shell and prevent the shell front end section from tearing off due to tensile failure of the plastic, said front end section of the plastic shell being crimped in such manner that the open mouth end is turned around to face in a direction opposite to the direction of flight of the associated projectile means, said chamber abutment means being positioned with respect to the shell insertion limiting means so that the distance therebetween is not greater than the overall length of the crimped shell and not shorter than about 3/32" than the overall length of the crimped shell.

References Cited by the Examiner

UNITED STATES PATENTS

| | | | |
|---|---|---|---|
| 513,398 | 1/1894 | Kingsland et al. | 42—76 |
| 1,760,731 | 5/1930 | Williams | 42—76 |
| 2,125,224 | 7/1930 | Edwards | 102—42 |
| 2,770,194 | 11/1956 | Kopf et al. | 102—38 |
| 2,953,990 | 9/1960 | Miller | 102—42 |
| 3,053,185 | 9/1962 | Oberfell et al. | 102—42 X |
| 3,105,439 | 10/1963 | Young | 102—43 |
| 3,147,709 | 9/1964 | Werner | 102—42 |

SAMUEL FEINBERG, *Primary Examiner.*

BENJAMIN A. BORCHELT, *Examiner.*